(12) United States Patent
Sano et al.

(10) Patent No.: US 7,700,867 B2
(45) Date of Patent: Apr. 20, 2010

(54) APPARATUS AND METHOD OF PLAYING BACK AUDIO SIGNAL

(75) Inventors: Akane Sano, Tokyo (JP); Susumu Takatsuka, Tokyo (JP); Toru Sasaki, Tokyo (JP); Yuichi Sakai, Kanagawa (JP); Toshiro Terauchi, Tokyo (JP); Hirofumi Tamori, Tokyo (JP); Makoto Inoue, Tokyo (JP); Katsuya Shirai, Kanagawa (JP); Motoyuki Takai, Tokyo (JP); Kenichi Makino, Kanagawa (JP); Takatoshi Nakamura, Kanagawa (JP); Akihiro Komori, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 597 days.

(21) Appl. No.: 11/634,625

(22) Filed: Dec. 6, 2006

(65) Prior Publication Data

US 2007/0186756 A1   Aug. 16, 2007

(30) Foreign Application Priority Data

Dec. 16, 2005   (JP)   ............................. 2005-363098

(51) Int. Cl.
*G10H 7/00* (2006.01)
(52) U.S. Cl. ........................................................ 84/612
(58) Field of Classification Search .................. 84/612; 700/94; 482/3–9, 900, 901
See application file for complete search history.

(56) References Cited

U.S. PATENT DOCUMENTS

| 2003/0060728 | A1 | 3/2003 | Mandigo |
| 2005/0249080 | A1 | 11/2005 | Foote |
| 2006/0107822 | A1* | 5/2006 | Bowen ........................ 84/612 |
| 2007/0074619 | A1* | 4/2007 | Vergo ........................... 84/612 |

FOREIGN PATENT DOCUMENTS

| EP | 1 705 588 A | 9/2006 |
| EP | 1 729 290 A | 12/2006 |
| JP | 06-075573 | 3/1994 |
| JP | 10-063265 | 3/1998 |
| JP | 2002-73018 | 3/2002 |
| JP | 2002-341865 | 11/2002 |
| JP | 2002-373169 A | 12/2002 |
| JP | 2003-085888 A | 3/2003 |
| JP | 2003-305146 | 10/2003 |
| JP | 2005-156641 | 6/2005 |
| JP | 2005-292730 A | 10/2005 |
| JP | 2006-239397 | 9/2006 |
| JP | 2006-239398 | 9/2006 |
| JP | 2006-262973 | 10/2006 |

* cited by examiner

*Primary Examiner*—Jeffrey Donels
(74) *Attorney, Agent, or Firm*—Wolf, Greenfield & Sacks, P.C.

(57) ABSTRACT

An apparatus of playing back an audio signal includes storage means for dividing exercise tempos of a user into a plurality of groups and storing digital audio data concerning music pieces, the digital audio data being associated with the plurality of groups; a playback circuit that plays back the digital audio data; detecting means for detecting an exercise tempo of the user; and a control circuit that reads out the digital audio data from the storage means to supply the readout digital audio data to the playback circuit. The control circuit determines which group, among the plurality of groups, the exercise tempo detected by the detecting means belongs to, and reads out the digital audio data concerning a music piece associated with the determined group from the storage means to supply the readout digital audio data to the playback circuit.

15 Claims, 11 Drawing Sheets

FIG. 5

| PLAY LIST | PL(5) | PL(1) | PL(2) | PL(6) | PL(3) | PL(4) | PL(7) |
|---|---|---|---|---|---|---|---|
| WALKING TEMPO | LOWER THAN 80 | 80-120 | 120-140 | 140-160 | 160-180 | 180-210 | 210 OR HIGHER |
| | MD(5) | MD(1) | MD(2) | MD(6) | MD(3) | MD(4) | MD(7) |
| MUSIC PIECE (FILE NAME) | E1 | A1 | B1 | F1 | C1 | D1 | G1 |
| | E2 | A2 | B2 | F2 | C2 | D2 | G2 |
| | E3 | A3 | B3 | F3 | C3 | D3 | G3 |
| | ... | ... | ... | ... | ... | ... | ... |
| | Ee | Aa | Bb | Ff | Cc | Dd | Gg |

| t | MT(t) |
|---|---|
| 01:00:00 | 120 |
| 01:00:01 | 121 |
| 01:00:02 | 123 |
| 01:00:03 | 121 |

WALKING TEMPO (t)

| j | m_MT(j) |
|---|---|
| 01:00:00 | 120 |
| 01:00:05 | 121 |
| 01:00:10 | 140 |
| 01:00:15 | 145 |

AVERAGE WALKING TEMPO m_MT (j)

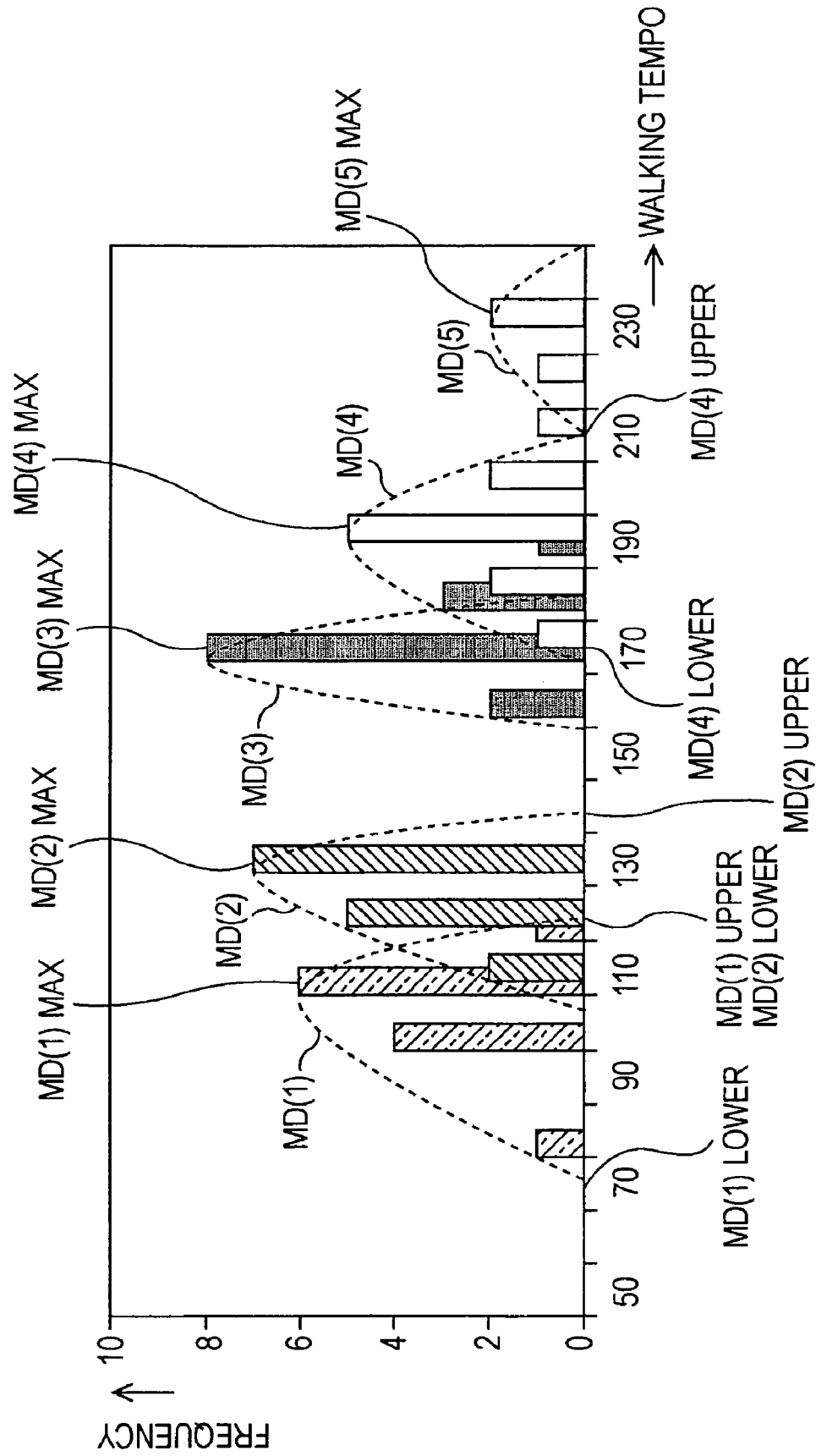

FIG. 9A

| n | MD(n) LOWER | MD(n) UPPER | MS(n) |
|---|---|---|---|
| 1 | 80 | 120 | MS(1) |
| 2 | 120 | 140 | MS(2) |
| 3 | 160 | 180 | MS(3) |
| 4 | 180 | 210 | MS(4) |

FIG. 9B

| n | MD(n) LOWER | MD(n) UPPER | MS(n) |
|---|---|---|---|
| 5 | 0 | 80 | MS(5) |
| 6 | 140 | 160 | MS(6) |
| 7 | 210 | 999 | MS(7) |

FIG. 10

| t | m_MT(t) | MS(t) | C(t) | MUSIC PIECE TO BE PLAYED BACK |
|---|---|---|---|---|
| 00:00:00 | 130 | MS(2) | 2 | MUSIC PIECE IN PL(2) |
| 00:00:05 | 135 | MS(2) | 2 | MUSIC PIECE IN PL(2) |
| 00:00:10 | 165 | MS(3) | 3 | MUSIC PIECE IN PL(2) |
| 00:00:15 | 170 | MS(3) | 3 | MUSIC PIECE IN PL(3) |
| 00:00:20 | 175 | MS(3) | 3 | MUSIC PIECE IN PL(3) |
| ... | ... | ... | ... | ... |

APPARATUS AND METHOD OF PLAYING BACK AUDIO SIGNAL

CROSS REFERENCES TO RELATED APPLICATIONS

The present invention contains subject matter related to Japanese Patent Application JP 2005-363098 filed in the Japanese Patent Office on Dec. 16, 2005, the entire contents of which are incorporated herein by reference.

BACKGROUND OF THE INVENTION

1. Field of the Invention

The present invention relates to an apparatus and method of playing back an audio signal.

2. Description of the Related Art

In recent years, an increasing number of people address themselves to walking, jogging, or running for the purpose of health maintenance, health promotion, and/or dieting because of increasing awareness of health. In order to achieve a certain effect from such walking or running, it is necessary to continuously perform the walking or running for a quite a large amount of time (exercise including the walking, jogging, and running is hereinafter collectively referred to as "walking" for simplicity).

Audio players which walkers (users) can carry during walking and which are capable of playing back music pieces having tempos matching with the walking tempos of the walkers are proposed. The walking tempo denotes the number of steps per unit time, for example, per one minute. The music tempo denotes the number of beats per one minute. In this specification, the walking tempo is represented in units of steps per minute (spm) and the music tempo is represented in units of beats per minute (bpm).

With such audio players, the walkers can enjoy walking in rhythm with the music.

Related art concerning the above devices is disclosed in, for example, Japanese Unexamined Patent Application Publication No. 2005-156641.

SUMMARY OF THE INVENTION

The walking tempos of walkers vary depending on the situations. Accordingly, it is necessary to shift the tempos of music pieces that are played back in accordance with the walking tempos of the walkers in the audio players described above. To this end, the walking tempos of the walkers are detected and the played back music pieces are changed in accordance with the detected walking tempos.

In this case, it is important to determine an amount of shift in the walking tempo when a played back music piece is changed to another one. For example, the audio player can be set so that the music piece is changed if the walking tempo exceeds a predetermined rate. However, when the audio player is set in the above manner, the music piece is changed with a small amount of shift in the walking tempo at slow walking tempos while the music piece is not changed even with a large amount of shift in the walking tempo at fast walking tempos.

In contrast, if the audio player is set so that the music piece is changed if the walking tempo exceeds a predetermined magnitude, it is possible to appropriately change the music piece regardless of whether the walking tempo is slow or fast. However, since the walking tempo is shifted depending on the physical condition of the walker or differs from person to person and the walking tempo itself fluctuates, it is necessary for the walker to finely set or adjust the audio player.

Consequently, it is necessary to sufficiently consider the conditions for changing the music pieces to be played back in accordance with shifts in the walking tempo. Since the walkers can enjoy music during walking, the walkers can feel discomfort or, in some cases, it can be dangerous if the music piece is changed or the music tempo is shifted in a halfway manner.

It is desirable to appropriately change the music piece that is played back if the walking tempo of a user is shifted and to play back a music piece having a music tempo matching with the walking tempo of the user.

According to an embodiment of the present invention, an apparatus of playing back an audio signal includes storage means for dividing exercise tempos of a user into a plurality of groups and storing digital audio data concerning music pieces, the digital audio data being associated with the plurality of groups; a playback circuit that plays back the digital audio data; detecting means for detecting an exercise tempo of the user; and a control circuit that reads out the digital audio data from the storage means to supply the readout digital audio data to the playback circuit. The control circuit determines which group, among the plurality of groups, the exercise tempo detected by the detecting means belongs to, and reads out the digital audio data concerning a music piece associated with the determined group from a storage device to supply the readout digital audio data to the playback circuit.

According to another embodiment of the present invention, a method of playing back an audio signal includes the steps of dividing exercise tempos of a user into a plurality of groups; detecting an exercise tempo when the user plays back a music piece during exercise; determining which group, among the plurality of groups, the detected exercise tempo belongs to; and reading out digital audio data concerning a music piece associated with the exercise tempos in the determined group from a storage device to supply the readout digital audio data to a playback circuit.

According to further another embodiment of the present invention, a method of playing back an audio signal includes the steps of dividing exercise tempos of a user into a plurality of groups; generating a plurality of play lists each having music pieces associated with the plurality of groups registered therein; detecting an exercise tempo when the user plays back a music piece during exercise; determining which group, among the plurality of groups, the detected exercise tempo belongs to; selecting a play list associated with the determination result from the plurality of play lists; and reading out digital audio data concerning a music piece registered in the selected play list from a storage device to supply the readout digital audio data to a playback circuit.

According to the present invention, it is determined which group the current exercise tempo belongs to, among the groups resulting from the grouping of the exercise tempos on the basis of the frequencies of occurrence of the exercise tempos, and a music piece is selected on the basis of the determination result. Accordingly, an appropriate music piece can be played back regardless of whether the exercise tempo is slow or fast, and the user can enjoy comfort of the music piece matching with own exercise tempo, selected by the audio player. In addition, it is not necessary for the user to finely set or adjust the audio player and the audio player is

BRIEF DESCRIPTION OF THE DRAWINGS

FIG. 5 is a table used for describing the present invention;
FIG. 8 is a graph used for describing the present invention;
FIGS. 9A and 9B are tables used for describing the present invention;
FIG. 10 is a table used for describing the present invention.

DESCRIPTION OF THE PREFERRED EMBODIMENTS

Figure 1:
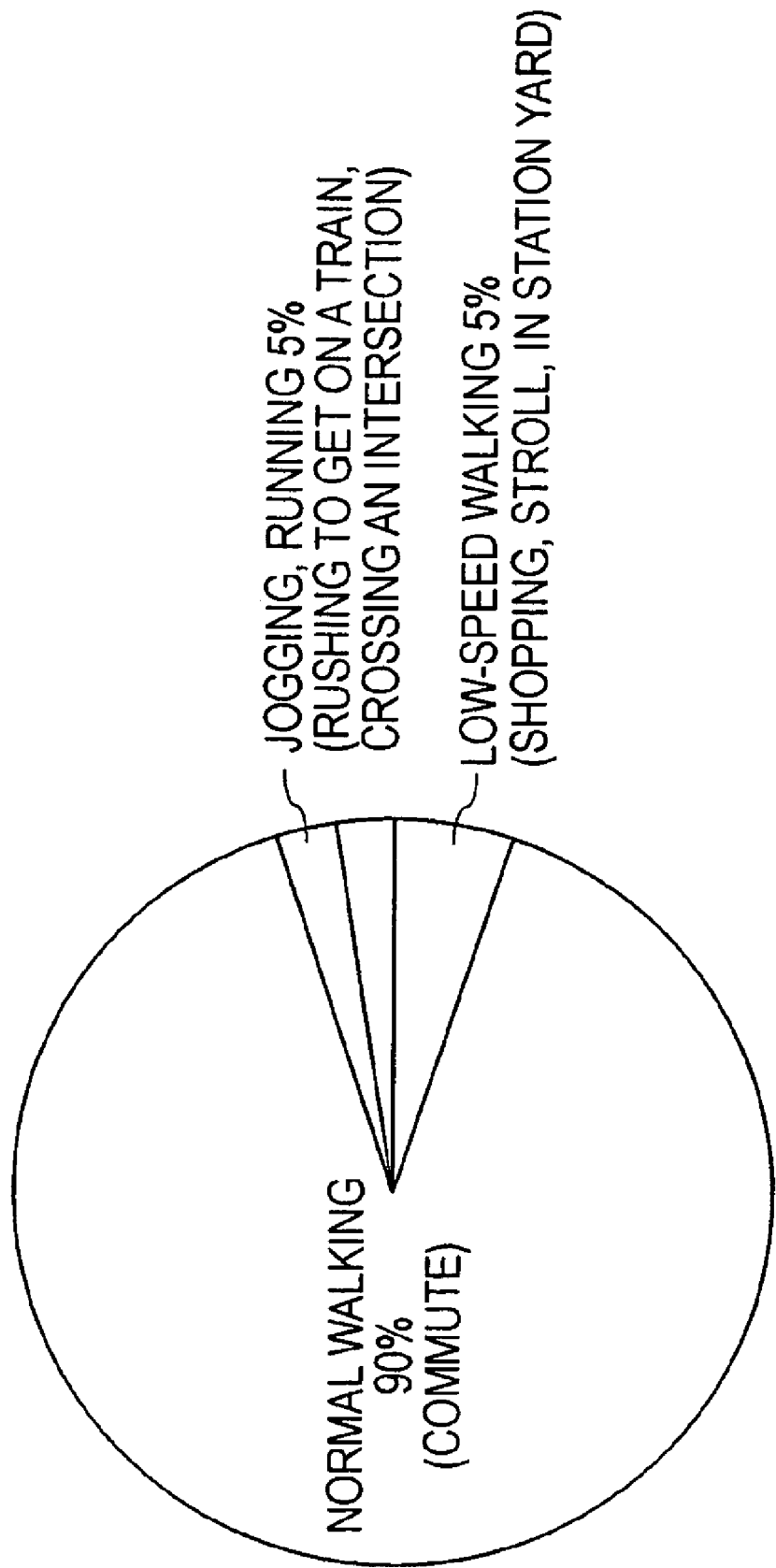
FIG. 1 is a graph used for describing the present invention.

Analysis of Walking Pattern Analysis of the walking in daily life of fourteen subjects (eight adult male and six adult female) results in four groups including "low-speed walking", normal walking", "jogging", and "running", as shown in FIG. 1. That is, the walking in daily life is roughly divided into the four groups from the "low-speed walking" to the "running".

Figure 2:
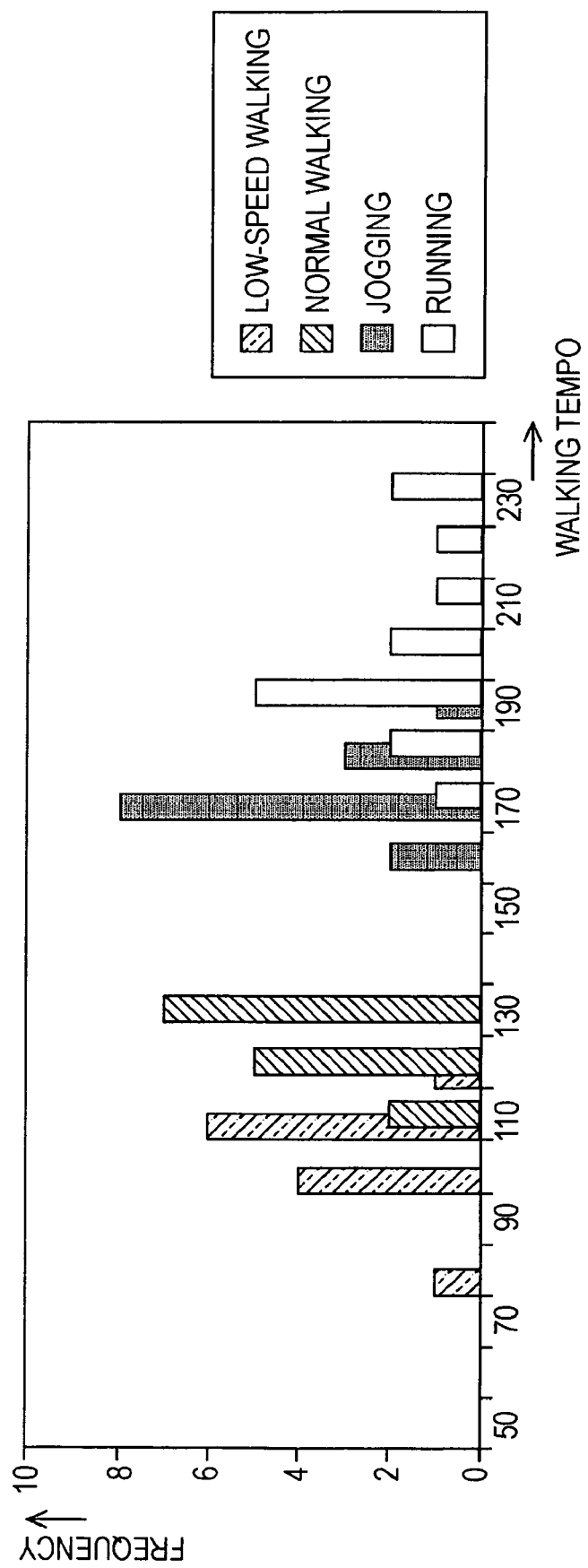
FIG. 2 is a graph used for describing the present invention.

In addition, measurement of the walking tempos of the subjects in the four groups shows a result shown in a graph in FIG. 2. Referring to FIG. 2, the horizontal axis represents the walking tempo (the average walking tempo for a few seconds) and the vertical axis represents the frequency (the number of the persons). In FIG. 2 and the subsequent figures, the walking tempos are rounded up in units of 10 spm when the horizontal axes of the graphs represent the walking tempo. In other words, the walking tempos are divided for every 10 spm and the horizontal axes are shown in this manner.

The measurement result shows that the walking tempos in daily life are not uniformly distributed but are included in any of the groups. The measurement result also shows that the walking tempos in the ranges of 80 spm or lower, 140 spm to 160 spm, and 230 or higher spm hardly appear in daily life. An intermediate range having the walking tempo 140 spm to 160 spm which do not appear is referred to as a "blank range".

The blank range appears because the human being automatically selects a state in which his transport energy is efficiently consumed to walk. The walking tempos within the blank range occupy an intermediate range between the walking and the jogging and are in a state of so-called "race walking". However, the human being hardly walks in the state of the race walking in his daily life. Accordingly, the blank range hardly appears in the daily life, as shown by the measurement result in FIG. 2.

Figure 3:
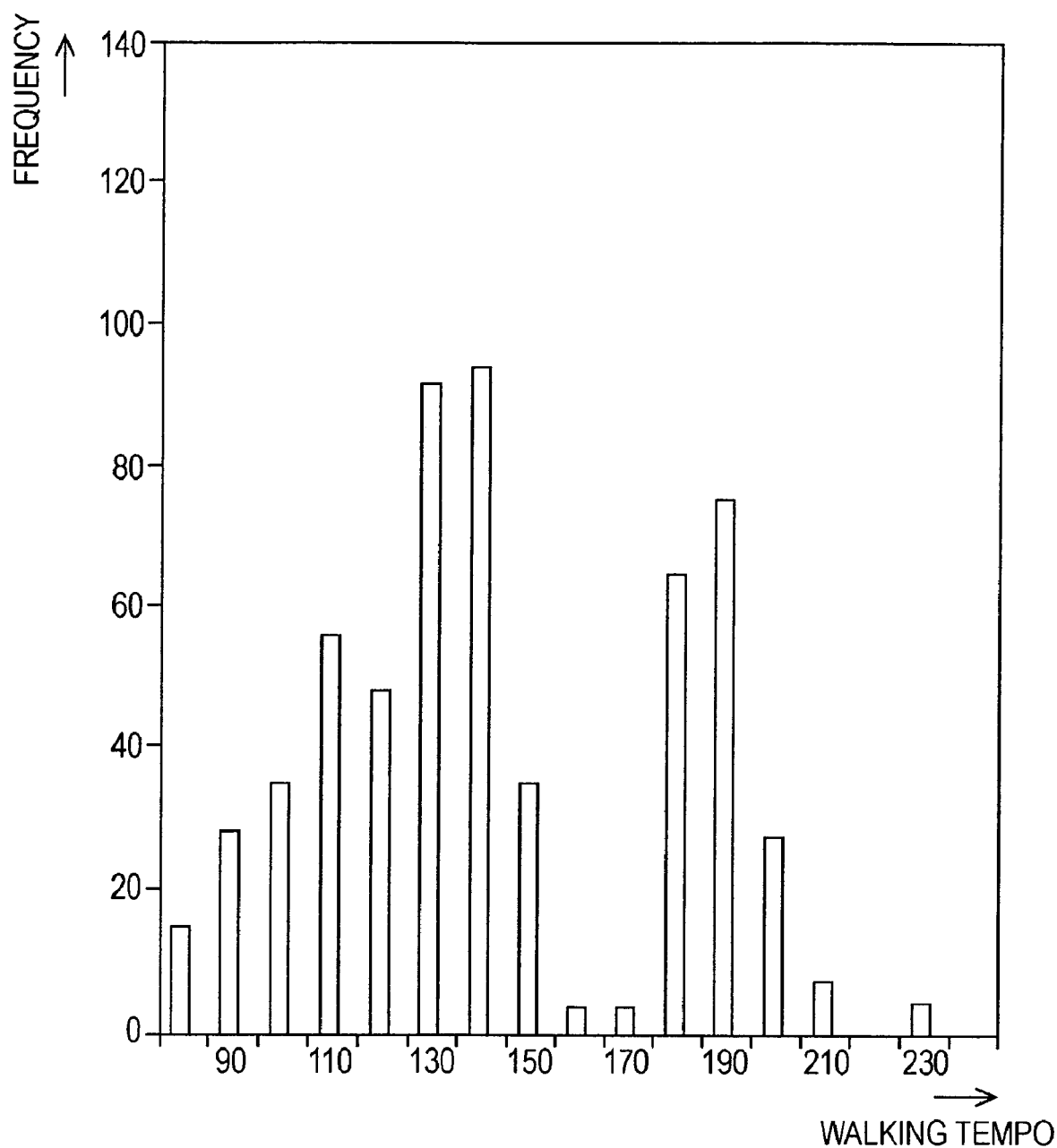
FIG. 3 is a graph used for describing the present invention.

FIG. 3 shows a result of measuring the relationship between the walking tempos of a certain subject and the frequencies of occurrence of his walking tempos. The measurement result shows that the walking tempos of the subject are roughly grouped into the above four groups. The walking tempos vary in each group. The blank range appears also in this graph. However, it is possible to calculate the average value, the standard deviation, and the coefficient of variation of each group and to estimate the range of each group.

Outline of Embodiments of the Present Invention

Figure 4:
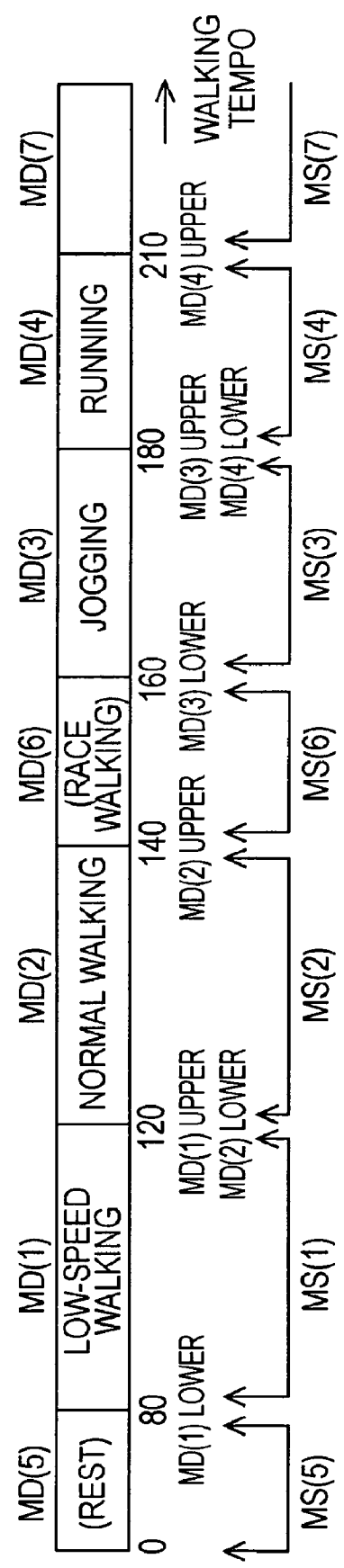
FIG. 4 is a diagram used for describing the present invention.

According to embodiments of the present invention, when the music piece is played back by an audio player during walking, a music piece is played back on the basis of the analysis results described above in the following manner described with reference to FIGS. 1 to 3.
(1) The walking tempos of a walker are acquired in advance.
(2) As shown in FIG. 4, the acquired walking tempos are divided into groups MD(1) to MD(7) in accordance with the frequencies of occurrence.
(3) When the audio player is used (during playback), the audio player determines in real time which group among the groups MD(1) to MD(7) the walking tempo during the playback belongs to.
(4) The audio player plays back a music piece having a music tempo matching with the walking tempos in the determined group.

In the embodiments described below of the present invention, the steps (3) and (4) are performed in the following manner in order to smoothly select a music piece and change to the selected music piece.
(5) As shown in FIG. 5, play lists PL(1) to PL (7) are prepared. Music pieces are registered by tempo in the play lists PL(1) to PL (7). The music tempos registered in the play lists PL(1) to PL (7) are associated with the walking tempos in the groups MD(1) to MD(7) described above in (2).
(6) The music pieces are registered in any of the play lists PL(1) to PL (7) in accordance with the tempos of the music pieces.
(7) When the audio player is used (during playback), the audio player determines in real time which play list among the play lists PL(1) to PL(7) the walking tempo during the playback belongs to.
(8) The audio player selects the play list indicated by the determination result and selects a music piece from the music pieces registered in the selected play list to play back the selected music piece.

Learning of Walking Tempo

Figure 6:
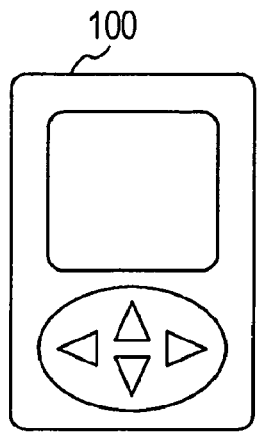
FIG. 6 is a diagram used for describing the present invention.

Referring to FIG. 6, in learning of the walking tempos, a user (walker) walks while carrying an audio player 100 according to an embodiment of the present invention. During the walking, the audio player 100 measures the walking tempos (instantaneous walking tempos) MT(t) for every several milliseconds to several seconds to calculate average walking tempos m_MT(t) in units of several seconds from the measured walking tempos MT(t). FIG. 6 shows the results yielded when the audio player 100 measures the walking tempos MT(t) for every second to calculate the average walking tempos m_MT(t) for every five seconds from the measured walking tempos MT(t).

The calculated average walking tempos m_MT(t) are stored in a storage unit in the audio player 100 along with time information. The audio player 100 learns the walking tempos of the user in the manner described above.

Figure 7:
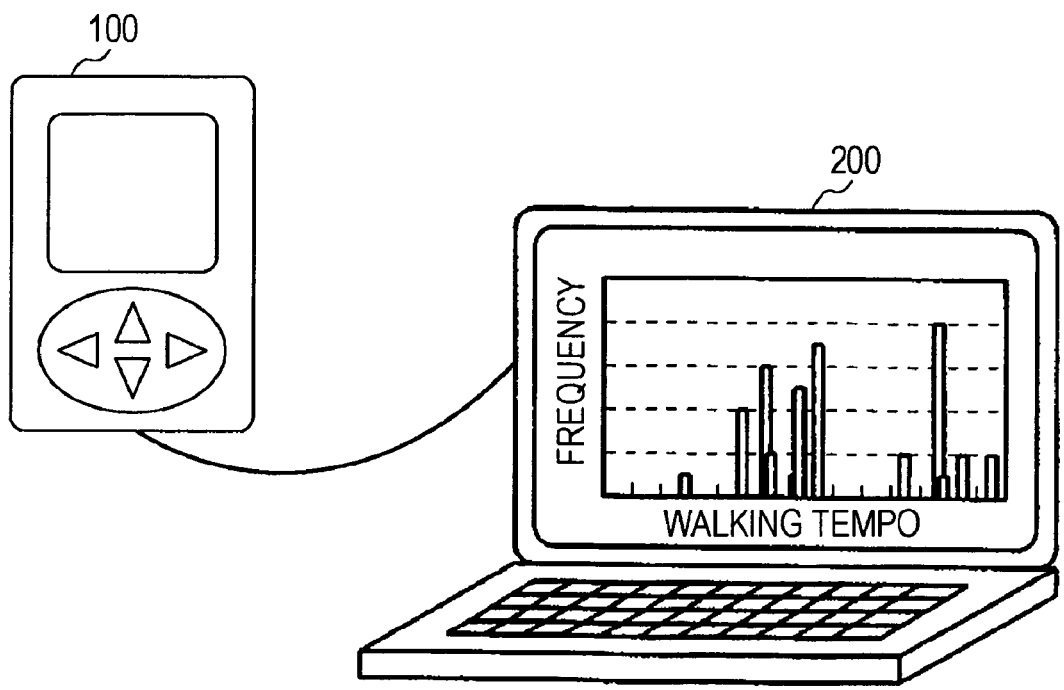
FIG. 7 is a diagram used for describing the present invention.

After learning the walking tempo, the audio player 100 is connected to a personal computer 200, as shown in FIG. 7, to transfer the average walking tempos m_MT(t) and the time information stored in the audio player 100 to the personal computer 200.

If the past average walking tempos m_MT(t) and time information have been stored in the personal computer 200, the transferred average walking tempos m_MT(t) and time information may be merged with the stored average walking tempos m_MT(t) and time information.

Grouping of Walking Tempos

The personal computer 200 generates a histogram of the frequencies of occurrence of the average walking tempos m_MT(t) from the transferred average walking tempos m_MT(t) and time information. The personal computer 200 detects local maximum values from the histogram to divide the walking tempos into groups.

FIG. 8 shows an example of the histogram generated from the average walking tempos m_MT(t). Referring to FIG. 8, the horizontal axis represents the average walking tempo m_MT(t) and the vertical axis represents the frequency of occurrence. In this histogram, the local maximum values are detected and the detected local maximum values are sequentially named local maximum values MD(1)max, MD(2)max, . . . , MD(k)max in the direction of the horizontal axis. In the example in FIG. 8, "k" is equal to five.

The distribution of the average walking tempos having the local maximum values MD(1)max to MD(k)max as peaks is divided into groups MD(1) to MD(k). Then, in each of the groups MD(1) to MD(k), a lower limit MD(n)lower of the average walking tempos m_MT(t) and an upper limit MD(n)upper of the average walking tempos m_MT(t) are calculated, where "n" denotes a value from one to "k". In the example in FIG. 8, the lower limits MD(1)lower to MD(5)lower and the upper limits MD(1)upper to MD(5)upper are calculated.

If the group MD(n) is not overlapped with another or other groups, attention is directed to both ends of the group MD(n) to set the values on the horizontal axis, having the frequency of occurrence being equal to zero, to the lower limit MD(n)lower and the upper limit MD(n)upper. If the two groups MD(n-1) and MD(n) are overlapped with each other, a medium value between the local maximum value MD(n-1)max of the group MD(n-1) and the local maximum value MD(n)max of the group MD(n) is set to the upper limit MD(n-1)upper of the group MD(n-1) and the lower limit MD(n)lower of the group MD(n).

If the local maximum value appears in the upper end or lower end of the histogram, as in the local maximum value MD(5)max and the group MD(5) to which the local maximum value MD(5)max belongs in the example shown in FIG. 8, the local maximum value and its group are ignored.

Rearrangement of the group MD(n) in the above manner in the example shown in FIG. 8 provides four pairs: from the lower limit MD(1)lower and the upper limit MD(1)upper to the lower limit MD(4)lower to the upper limit MD(4)upper, as shown in FIG. 9A. In the following description, the four pairs of the lower limit MD(n)lower and the upper limit MD(n)upper are used as new lower limits and upper limits of the walking tempo group MD(n).

Referring to FIG. 9B, a case where the average walking tempo m_MT(t) is 80 spm or lower (too slow), a case where the average walking tempo m_MT(t) is 140 spm to 160 spm (blank range), and a case where the average walking tempo m_MT(t) is 210 spm or higher (too fast) are grouped into MD(5), MD(6), and MD(7). As shown in the most right column in FIGS. 9A and 9B, a pair of the lower limit MD(n)lower and the upper limit MD(n)upper is hereinafter referred to as a "walking status MS(n)".

The walking statuses MS(1) to MS(7) shown in FIGS. 9A and 9B is shown in FIG. 4 described above. The groups MD(1) to MD(4) correspond to the "low-speed walking", "normal walking", "jogging", and "running", respectively, of the corresponding walker.

After the above analysis is finished, the analysis result, for example, the walking statuses MS(1) to MS(7) shown in FIGS. 9A and 9B are transferred to the audio player 100.

Registration of Music Piece in Play List

Each play list includes the music pieces grouped on the basis of the walking status MS(n), as described above with reference to FIG. 5. In the play lists shown in FIG. 5, file names of digital audio data to be played back as the music pieces are grouped on the basis of the walking status MS(n).

Specifically, in the play lists shown in FIG. 5, the seven play lists PL(1) to PL(7) are prepared. The play lists PL(1) to PL(4) are associated with the walking tempos having the walking statuses MS(1) to MS(4), respectively. The play lists PL(5) to PL(7) are associated with the walking tempos having the walking statuses MS(5) to MS(7), respectively.

If the tempo of a certain music piece belongs to the play list PL(j) ("j" is equal to a value from one to seven), the file name of the digital audio data concerning the music piece is registered in the play list PL(j). In the example shown in FIG. 5, the music pieces having the music tempos lower than 80 bpm are registered in the play list PL(5) as file names E1 to Ee. The music pieces having the music tempos 80 to 120 bpm are registered in the play list PL(1) as file names A1 to Aa, . . . , and the music pieces having the music tempos 210 bpm or higher are registered in the play list PL(7) as file names G1 to Gg.

Playback of Music Piece

When the user uses the audio player 100 during walking and instructs the audio player 100 to play back a music piece, the audio player 100 detects the average walking tempo m_MT(t) at this time. The audio player 100 refers to any of the walking statuses MS(1) to MS(7) on the basis of the detected current average walking tempo m_MT(t) to determine which walking status among the walking statuses MS(1) to MS(7) the current average walking tempo m_MT(t) has. The determination result is set as a value C(t).

For example, if the average walking tempo m_MT(t) varies in a manner shown in the second column in FIG. 10, the average walking tempo m_MT(t) is included in the walking status MS(t) in the third column and, thus, the determination value C(t) shown in the fourth column is yielded.

As shown in the fifth column in FIG. 10, the audio player 100 selects a play list PL(C(t)) from the play lists PL(1) to PL(7) on the basis of the determination value C(t), selects a music piece from the selected play list PL(C(t)), and plays back the selected music piece.

During normal operation, that is, during the playback of a music piece, the audio player 100 compares the current walking status MS(C(t)) with the previous walking status MS(C(t-1)) to determine which situation of the following (A) and (B) occurs:

(A) the current walking status MS(C(t)) differs from the previous walking status MS(C(t-1)) and the music piece that is being playing back has been played back for a time period longer than a predetermined time period, and (B) (A) is not applied.

If the situation (B) occurs (for example, the first to third rows in FIG. 10), the audio player 100 continues playing back the music piece that is being playing back. If the music piece that is being played back is terminated, the audio player 100 selects a music piece from the current play list PL(C(t)) and plays back the selected music piece.

In contrast, if the situation (A) occurs (for example, the fourth row in FIG. 10), the audio player 100 selects the play list PL(C(t)) on the basis of the determination value C(t) at the time when the situation (A) occurs, selects a music piece from the play list PL(C(t)), and plays back the selected music piece. Accordingly, the audio player 100 changes the music piece that is to be played back and shifts the music tempo of the music piece from that moment in accordance with the average walking tempo m_MT(t) to continue playing back the music piece.

The audio player 100 plays back the music piece having the music tempo matching with the average walking tempo m_MT(t) in the manner described above. Since the audio player 100 learns the average walking tempo to obtain the walking tempo groups, for example, shown in FIG. 4, and selects a music piece such that the tempo of the music piece to be played back is included in the range of the corresponding walking tempo group, the audio player 100 can appropriately change the music piece to be played back regardless of whether the walking tempo is slow or fast.

In addition, since the audio player 100 obtains the walking tempo groups by learning, it is not necessary for the user to finely set or adjust the audio player 100 and the audio player 100 is unlikely to be affected by the physical condition of the user, individual differences, or the fluctuation of the walking tempo itself.

Example of Configuration of Audio Player 100

Figure 11:
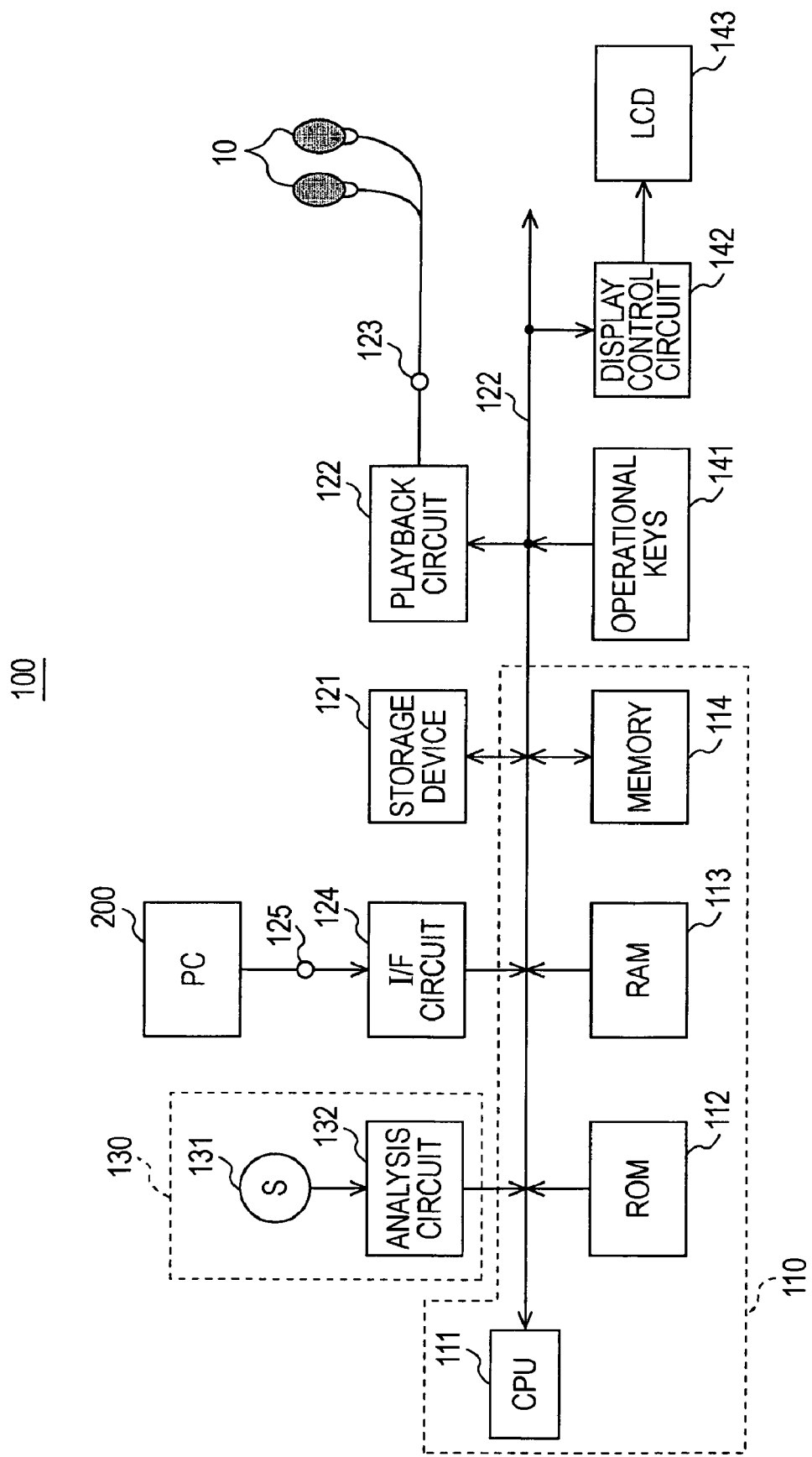
FIG. 11 is a block diagram showing an example of the circuit configuration of an audio player according to an embodiment of the present invention.

FIG. 11 is a block diagram showing an example of the circuit configuration of an audio player 100 according to an embodiment of the present invention. The audio player 100 can be used not only as a common portable player but also as a walking support player. The audio player 100 has a size and shape such that a user can carry, for example, in his pocket during walking, although now shown.

The audio player 100 includes a system control circuit 110, which is a microcomputer. The system control circuit 110 includes a central processing unit (CPU) 111 executing programs, a read only memory (ROM) 112 having various programs written therein, a random access memory (RAM) 113 used as a working area, and a non-volatile memory 114. The ROM 112, the RAM 113, and the non-volatile memory 114 are connected to the CPU 111 via a system bus 119.

The ROM 112 includes the programs which the CPU 111 uses to perform the various processes described above. A variety of information concerning the audio player 100 and the user is stored in the non-volatile memory 114, which is, for example, a flash memory.

The audio player 100 also includes a storage device 121. A variety of music data (digital audio data concerning music pieces) to be played back as the music pieces is stored in the storage device 121. Accordingly, the storage device 121 is, for example, a high-capacity flash memory or a compact hard disk device. The music data is stored in the storage device 121 as digital audio data compressed according to, for example, Motion Picture Experts Group (MPEG)-1/Audio Layer-3 (MP3).

The storage device 121 is connected to the system bus 119. A playback circuit 122 is also connected to the system bus 119. The playback circuit 122 includes a decoder circuit, a digital-to-analog (D/A) converter circuit, and an output amplifier (not shown). The decoder circuit decompresses the compressed music data into the original audio data. The D/A converter circuit performs D/A conversion to the digital audio data into an analog audio signal.

When the music data is supplied from the storage device 121 to the playback circuit 122, the playback circuit 122 performs the decompression and the D/A conversion to the music data and supplies the analog audio signal to a headphone jack 123. A headphone 10 is connected to the headphone jack 123.

An interface (I/F) circuit 124 is connected to the system bus 119. Music data supplied from an external personal computer (PC) 200 is supplied to the system control circuit 110 through an input connector 125 and the I/F circuit 124. The music data is stored in the storage device 121.

The audio player 100 further includes a detecting unit 130. The detecting unit 130 detects the walking tempo of the user when the user walks while carrying the audio player 100. In the example shown in FIG. 11, the detecting unit 130 includes a three-dimensional acceleration sensor 131 and an analysis circuit 132 analyzing an output from the acceleration sensor 131. The acceleration sensor 131 detects the body movement of the user. The analysis circuit 132 performs spectral analysis and autocorrelation calculation to the detected output to detect the walking tempo of the user on the basis of the interval of peaks of the acceleration. The detected walking tempo is supplied to the system control circuit 110 through the system bus 119.

Various operational keys 141 are connected to the system bus 119. A display device, for example, a liquid crystal display (LCD) 143 is also connected to the system bus 119 via a display control circuit 142. The operational keys 141 are used for determining whether the audio player 100 is used as the portable player or the walking support player, selecting an operation mode in the portable player or the walking support player, selecting a music piece, setting various settings, and so on. The LCD 143 displays the operation results of the operational keys 141 and information concerning the music piece that is being played back.

Operation

Storage of Music Piece

Music data concerning music pieces to be stored in the audio player 100 is compressed in advance and is prepared in the personal computer 200. The personal computer 200 is connected to the audio player 100, and a predetermined transfer program is executed in the personal computer 200 to instruct the personal computer 200 to transfer the music data. The music data prepared in the personal computer 200 is supplied to the audio player 100 through the input connector 125. The music data is received by the CPU 111 in the audio player 100 through the I/F circuit 124, and the received music data is stored in the storage device 121.

Learning of Walking Tempo

In order to learn the walking tempo, the audio player 100 is set to a learning mode and the user (walker) walks while carrying the audio player 100. During the walking, the audio player 100 performs the process described above in "Learning of Walking Tempo" to store the average walking tempo m_MT(t) and the time information shown in, for example, FIG. 6, in the memory 114. The walking tempo of the user is learned in this manner.

After learning the walking tempo of the user, the audio player 100 is connected to the personal computer 200 to transfer the average walking tempo m_MT(t) and the time information stored in the memory 114 to the personal computer 200.

Generation of Walking Statuses MS(1) to MS(7)

The personal computer 200 analyzes the transferred average walking tempo m_MT(t) and the time information, generates the walking statuses MS(1) to MS(7) shown in, for example, FIGS. 9A and 9B, and transfers the generated walking statuses MS(1) to MS(7) to the audio player 100, in the manner described above in "Grouping of Walking Tempos". The audio player 100 stores the walking statuses MS(1) to MS(7) in the memory 114.

Generation of Play Lists PL(1) to PL(7)

In response to an instruction to generate the play lists, the audio player 100 sets the ranges of the walking tempos, associated with the play lists PL(1) to PL(7), in accordance with the walking statuses MS(1) to MS(7) stored in the manner described in "Generation of walking statuses MS(1) to MS(7)".

The audio player 100 analyzes the tempo of each music piece stored in the storage device 121 in the manner described in "Storage of Music Piece" and registers the file name of the music piece in the corresponding play list of the play lists PL(1) to PL(7) on the basis of the analyzed music tempo.

The tempo of the music piece can be yielded by performing the spectral analysis to the music data and calculating the autocorrelation function. Information indicating the tempo of the music piece may be added to the music data as meta-information when the music data is prepared in the personal computer 200.

Playback of Music as Common Portable Player

When the audio player 100 is used as a common portable player, in response to an instruction for playback, the music data stored in the storage device 121 is read out and the readout music data is supplied to the playback circuit 122 where the data decompression and the D/A conversion is performed.

The analog audio signal of the readout music data is supplied from the playback circuit 122 to the headphone 10. As a result, the user can listen to the music piece with the headphone 10. The name of the music piece that is being playing back is displayed in the LCD 143.

The music data is read out from the storage device 121 in accordance with a playback mode set in advance. The playback modes set in advance include Normal (playing back only one music piece), All (all the music pieces are played back continuously), Random (the music pieces are played back at random), and Repeat (the music piece or music pieces are played back repeatedly). The audio player 100 can be used as a common portable player in the manner described above.

When any of the play lists PL(1) to PL(7) is specified, only the music pieces registered in the specified play list are selected and played back. For example, during sleeping, specifying the play list PL(5) causes the audio player 100 to play back the music pieces having slow tempos.

Playback of Music as Walking Support Player

When the audio player 100 is used as a walking support player, a music piece having a music tempo matching with the walking tempo is played back, as described above in "Playback of Music Piece". Specifically, in the audio player 100, in response to an instruction for playback, the average walking tempo m_MT(t) is detected by the detecting unit 130 and any of the walking statuses MS(1) to MS(7) stored in the memory 114 in "Generation of walking statuses MS(1) to MS(7)" is referred to on the basis of the detected average walking tempo m_MT(t). The current average walking tempo m_MT(t) is converted into the value C(t).

The play list PL(C(t)) indicated by the value C(t) is selected from the play lists PL(1) to PL(7) and the file name of music data is selected from the selected play list PL(C(t)). The music data having the selected file name is read out from the storage device 121 and the readout music data is supplied to the playback circuit 122 where the data decompression and the D/A conversion are performed. As a result, as in "Playback of Music as Common Portable Player", the user can listen to the music pieces stored in the audio player 100 with the headphone 10.

During normal operation, that is, during walking, the current walking status MS(C(t)) is compared with the previous walking status MS(C(t-1)) and a music piece is played back in accordance with the determination result (A) or (B), described above.

Also in this case, when the subsequent music piece is selected, the play list PL(C(t)) indicated by the value C(t) is selected from the play lists PL(1) to PL(7), and the file name of music data is selected from the selected play list PL(C(t)). The music data having the selected file name is read out from the storage device 121 and the readout music data is supplied to the playback circuit 122. During walking, a music piece having the music tempo matching with the average walking tempo m_MT(t) is played back in the manner described above.

SUMMARY

The audio player 100 according to the embodiment of the present invention learns the average walking tempo m_MT(t) in advance to generate the play lists PL(1) to PL(7) for every walking tempo range, as shown in FIG. 5. The audio player 100 determines which play list among the play lists PL(1) to PL(7) the current average walking tempo m_MT(t) is included to select a play list from the play lists PL(1) to PL(7) on the basis of the determination result C(t) and plays back a music piece in the selected play list.

Accordingly, a music piece having a music tempo matching with the walking tempo is automatically played back regardless of whether the walking tempo is slow or fast. The user (walker) can enjoy comfort of the music piece matching with own exercise tempo, selected by the audio player 100.

Since the audio player 100 obtains the walking status MS(n) by learning, it is not necessary for the user (walker) to finely set or adjust the audio player 100 and the audio player 100 is unlikely to be affected by the physical condition of the user, individual differences, or the fluctuation of the walking tempo itself.

Other Embodiments

Although the personal computer 200 generates the walking status MS(n) from the average walking tempo m_MT(t) and the time information in the above embodiments, the system control circuit 110 in the audio player 100 may generate the walking status MS(n). In addition, the personal computer 200 may generate the play lists PL(1) to PL(7) and may supply the generated play lists PL(1) to PL(7) to the audio player 100, along with the digital audio data concerning the music pieces.

Furthermore, a standard walking status may be prepared in advance in the audio player 100, and the prepared standard walking status may be corrected or adjusted in accordance with the walking tempo of the user who is walking. In this case, the music piece better matching with the walking pattern of the user can be selected as the number of times the audio player 100 is used is increased.

Figure 12:
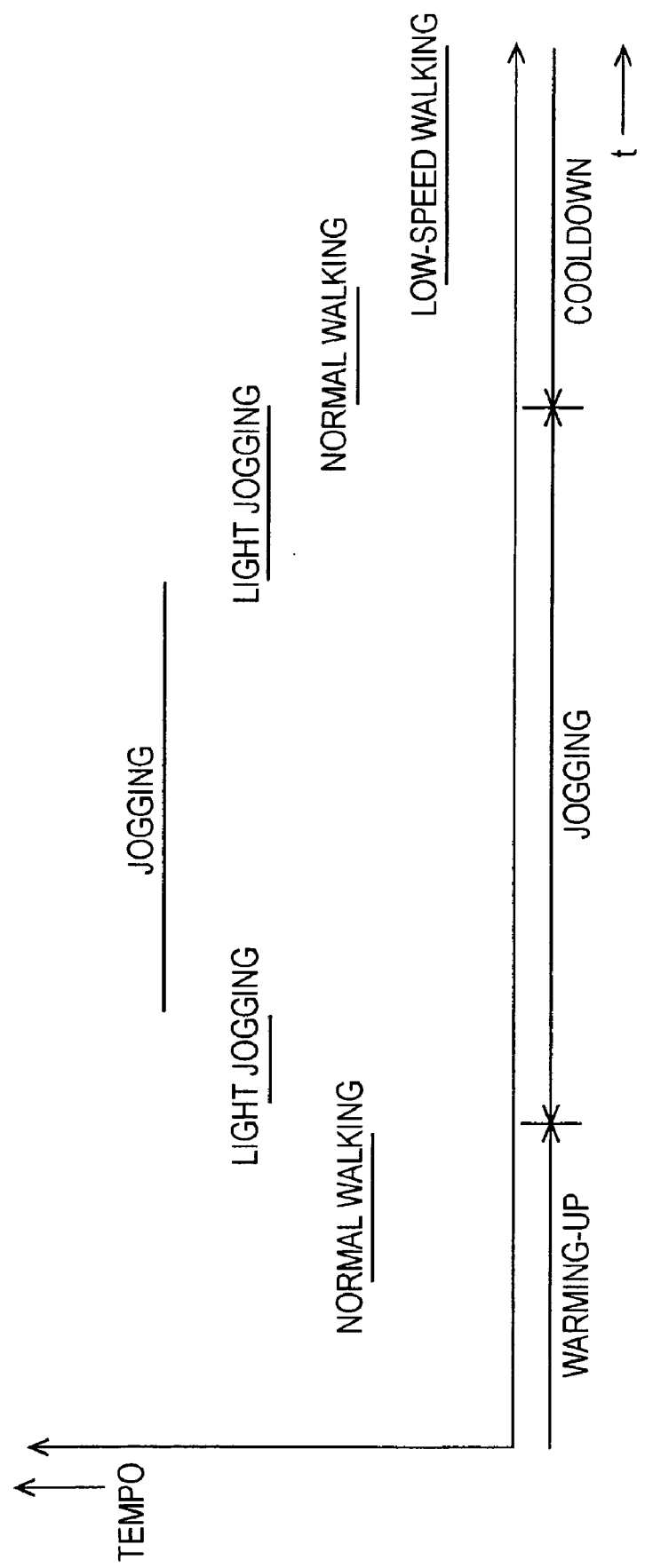
FIG. 12 is a diagram used for describing the present invention.

Although the walking in daily life is divided into the groups shown in FIG. 1 in the above embodiments, a race walking mode, a jogging mode, and so on may be prepared and be selected, in addition to the modes in daily life. For example, as shown in FIG. 12, the jogging mode may include four walking statuses: low-speed walking, normal walking, light jogging, and jogging. Alternatively, brisk walking may be provided between the normal walking and the jogging. The walking statuses and the play lists are prepared for the respective walking tempos to select a music piece.

If the user jogs at a desirable walking tempo, a music piece having a music tempo matching with the desirable walking tempo may be selected. If the user jogs at a walking tempo slightly faster or slower than the desirable walking tempo, a music piece having a music tempo slower or faster than the desirable walking tempo may be selected in order to cause the user to jog at the desirable walking tempo.

Walking tempos desirable for the elapse times of the jogging may be set in advance so that a music piece having a music tempo matching with the current running tempo is automatically selected. A history of the walking tempos may be generated to confirm the history after the jogging. A change of the music piece that is being playing back may be evaluated with the operational keys 141 to select a more appropriate music piece. The user may generate switching conditions suitable for him or the user may refer to the histogram (FIG. 8) to set or vary the lower limit MD(n)lower and the upper limit MD(n)upper by himself.

The acceleration sensor 131 may be provided independently of the audio player 100. For example, the acceleration sensor 131 may be mounted in the headphone 10. In this case, a detected signal is supplied to the analysis circuit 132 by wired or wireless communication. Instead of the acceleration sensor 131, a velocity sensor, a pedometer, a gyroscope, or a GPS may be used. The detecting unit 130 may be put in, for example, a pocket of the user or a bag which the user carries, instead of being worn by the user, as long as it can detect the walking tempo of the user.

The music data may be integrated with video digital data. Although the audio player 100 functions as the walking support player in daily life in the above embodiments, the audio player 100 may function as an exercise support player on the basis of exercise statuses, similar to the walking statuses, of race walking, jogging, cycling, or aerobics.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus to play back an audio signal, the apparatus comprising:
   means for acquiring in advance a plurality of exercise tempos of a user when the user is performing exercise;
   storage means for dividing the plurality of exercise tempos of the user into a plurality of groups based on frequencies of occurrence of each exercise tempo from the plurality of exercise tempos and storing the plurality of groups and digital audio data concerning music pieces, the digital audio data being associated with the plurality of groups;
   a playback circuit that plays back the digital audio data;
   detecting means for detecting, after the plurality of exercise tempos have been divided into the plurality of groups and the plurality of groups have been stored in the storage means, a current exercise tempo of the user; and
   a control circuit that reads out the digital audio data from the storage means to supply the readout digital audio data to the playback circuit,
   wherein the control circuit determines which group, among the plurality of groups, the current exercise tempo detected by the detecting means belongs to, and reads out digital audio data concerning a music piece associated with the determined group from the storage means to supply the readout digital audio data concerning the music piece to the playback circuit.

2. The apparatus to play back an audio signal according to claim 1,
   wherein the control circuit reads out the digital audio data concerning the music piece having a tempo associated with the current exercise tempo detected by the detecting means from the storage means to supply the readout digital audio data to the playback circuit.

3. The apparatus to play back an audio signal according to claim 1,
   wherein the storage means includes a plurality of play lists in which the music pieces associated with the plurality of groups, divided based on the frequencies of occurrence of each exercise tempo from the plurality of the exercise tempos, are registered, and
   wherein the control circuit
      determines which group, among the plurality of groups, the current exercise tempo detected by the detecting means belongs to,
      selects a play list associated with the determined group from the plurality of play lists, and
      reads out the digital audio data concerning a music piece registered in the selected play list from the storage means to supply the readout digital audio data concerning the music piece to the playback circuit.

4. The apparatus to play back an audio signal according to claim 3,
   wherein each play list includes music pieces having tempos associated with exercise tempos.

5. The apparatus to play back an audio signal according to claim 1,
   wherein the exercise is walking or running.

6. The apparatus to play back an audio signal according to claim 1,
   wherein the detecting means is integrated with the storage means, the playback circuit, and the control circuit or is provided independently of the storage means, the playback circuit, and the control circuit, and
   wherein the detecting means is worn by the user or is mounted to wear or baggage of the user.

7. The apparatus to play back an audio signal according to claim 1, wherein the plurality of exercise tempos comprise a plurality of average exercise tempos of the user measured at predetermined time intervals.

8. The apparatus to play back an audio signal according to claim 1, wherein the digital audio data concerning the music pieces is associated with the plurality of groups based on tempos of the music pieces.

9. A method of playing back an audio signal, the method comprising:
   acquiring in advance a plurality of exercise tempos of a user when the user is performing exercise;
   dividing the plurality of exercise tempos of the user into a plurality of groups based on frequencies of occurrence of each exercise tempo from the plurality of exercise tempos;
   storing the plurality of groups in a storage device;
   after the plurality of exercise tempos have been divided into the plurality of groups and the plurality of groups have been stored in the storage device, detecting a current exercise tempo when the user plays back music pieces during the exercise;
   determining which group, among the plurality of groups, the detected current exercise tempo belongs to; and
   reading out digital audio data concerning a music piece associated with exercise tempos in the determined group from the storage device to supply the readout digital audio data to a playback circuit.

10. The method of playing back an audio signal according to claim 9,
wherein the exercise is walking or running.

11. The method of playing back an audio signal according to claim 9, wherein the plurality of exercise tempos comprise a plurality of average exercise tempos of the user measured at predetermined time intervals.

12. The method of playing back an audio signal according to claim 9, wherein the digital audio data concerning the music piece is associated with the determined group based on a tempo of the music piece.

13. A method of playing back an audio signal, the method comprising:
    acquiring in advance a plurality of exercise tempos of a user when the user is performing exercise;
    dividing the plurality of exercise tempos of the user into a plurality of groups based on frequencies of occurrence of each exercise tempo from the plurality of exercise tempos;
    storing the plurality of groups in a storage device;
    generating a plurality of play lists each having music pieces associated with the plurality of groups stored in the storage device, wherein the music pieces are registered in the plurality of play lists based on respective tempos of the music pieces;
    after the plurality of exercise tempos have been divided into the plurality of groups and the plurality of groups have been stored in the storage device, detecting a current exercise tempo when the user plays back a music piece during the exercise;
    determining which group, among the plurality of groups, the detected current exercise tempo belongs to;
    selecting a play list associated with the determination result from the plurality of play lists; and
    reading out digital audio data concerning a music piece registered in the selected play list from the storage device to supply the readout digital audio data to a playback circuit.

14. The method of playing back an audio signal according to claim 13,
wherein the exercise is walking or running.

15. An apparatus to play back an audio signal, the apparatus comprising:
    a detecting unit to acquire in advance a plurality of exercise tempos of a user when the user is performing exercise;
    a storage unit to divide the plurality of exercise tempos of a user into a plurality of groups based on frequencies of occurrence of each exercise tempo from the plurality of exercise tempos and to store the plurality of groups and digital audio data concerning music pieces, the digital audio data being associated with the plurality of groups;
    a playback circuit to play back the digital audio data; and
    a control circuit that reads out the digital audio data from the storage unit to supply the readout digital audio data to the playback circuit,
    wherein:
        after the plurality of exercise tempos have been divided into the plurality of groups and the plurality of groups have been stored in the storage unit, the detecting unit detects a current exercise tempo of the user when the user performs the exercise, and
        the control circuit determines which group, among the plurality of groups, the current exercise tempo detected by the detecting unit belongs to, and reads out the digital audio data concerning a music piece associated with the determined group from the storage unit to supply the readout digital audio data concerning the music piece to the playback circuit.

* * * * *